United States Patent [19]

Montgomery et al.

[11] 4,160,617
[45] * Jul. 10, 1979

[54] CONTAINER CONVEYOR APPARATUS AND METHOD FOR VESSEL LOADING CRANE-YARD INTERFACE

[75] Inventors: Murray M. Montgomery, Oakland; William F. Gilger, Concord; William W. Steiner, San Francisco, all of Calif.

[73] Assignee: Matson Navigation Company, San Francisco, Calif.

[*] Notice: The portion of the term of this patent subsequent to Aug. 15, 1995, has been disclaimed.

[21] Appl. No.: 821,010

[22] Filed: Aug. 1, 1977

[51] Int. Cl.² .................................. B65G 67/00
[52] U.S. Cl. ..................... 414/139; 198/300; 212/15; 414/786
[58] Field of Search ............... 214/1 BB, 12, 14, 89, 214/152, 658, 394; 198/300, 718, 774, 775, 301; 212/11, 14, 15

[56] References Cited

U.S. PATENT DOCUMENTS

| 3,420,358 | 1/1969 | Iverson | 198/774 |
| 3,473,643 | 10/1969 | Janiske | 198/775 |
| 3,559,822 | 2/1969 | Lightenford | 214/14 |
| 3,698,581 | 10/1972 | Goyarts | 214/394 |

Primary Examiner—Albert J. Makay
Assistant Examiner—George F. Abraham
Attorney, Agent, or Firm—Townsend and Townsend

[57] ABSTRACT

The interface between a vessel loading crane and a container handling yard has been discovered to be the ideal location for the maintenance of a work bank of containers in conveyance along a one-way, reversible conveyance path. The conveyance path communicates to a vessel loading crane at one end of the path and apparatus for distributing and classifying the containers in the yard at the other end, this apparatus being preferably a carrier vehicle of the type that straddles the load it carries. Accordingly, a conveyor comprising an overlying support and an underlying shuttle car is disclosed. A shuttle car commutes reversibly along a shuttle car railway under containers supported on the overlying support. The shuttle car is operable to selectively raise containers above the support and move containers on the support reversibly and serially between work stations at either end of the conveyor. The work stations at either end of the conveyor are separated by a container storage interval to permit the supported stowage of one or more serially conveyed containers between work stations. Circuit logic is disclosed which actuates the shuttle car to serially convey containers in the desired direction of container flow between the work stations.

16 Claims, 9 Drawing Figures

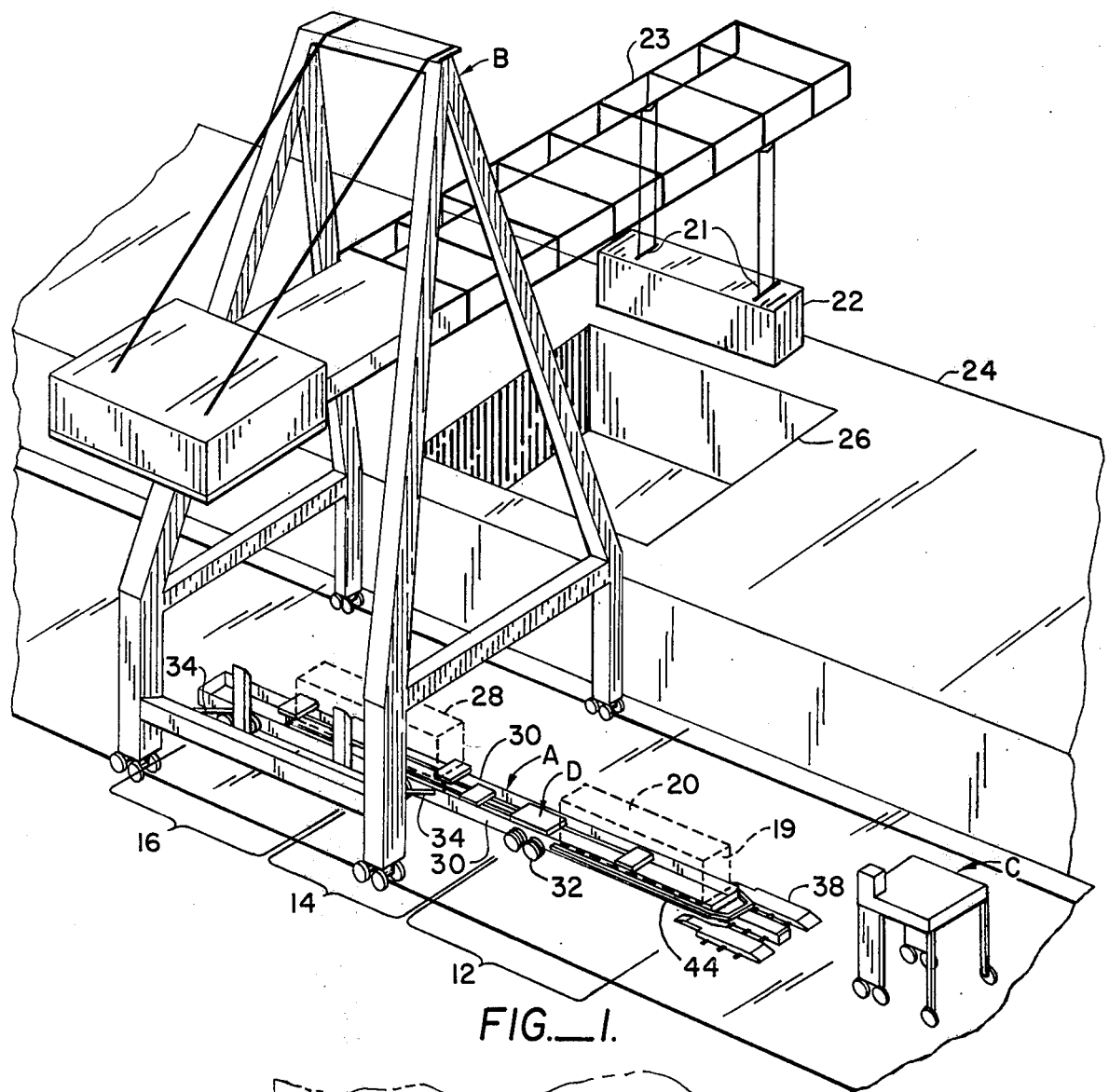
FIG._1.
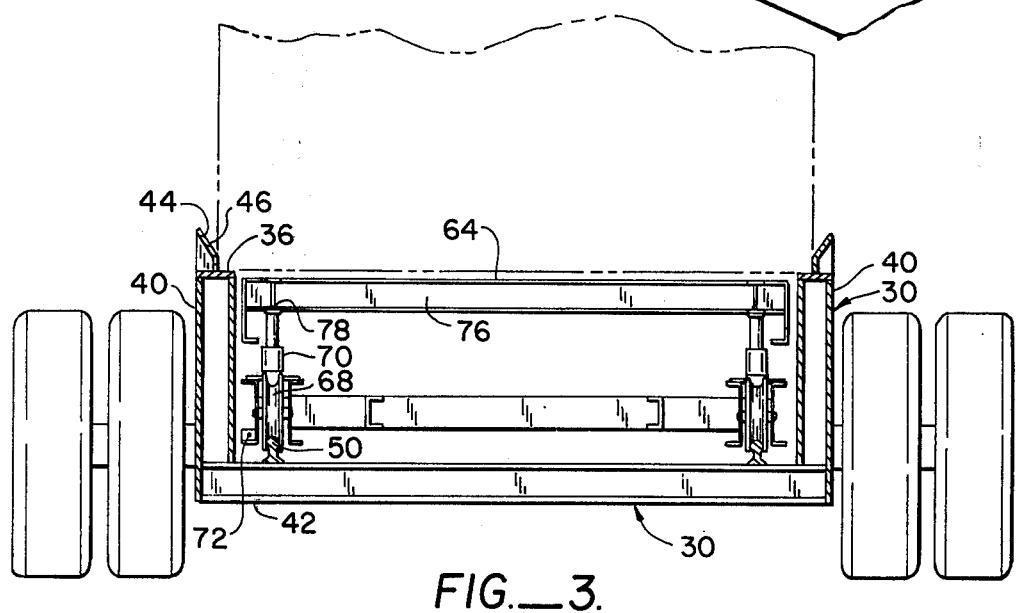
FIG._3.

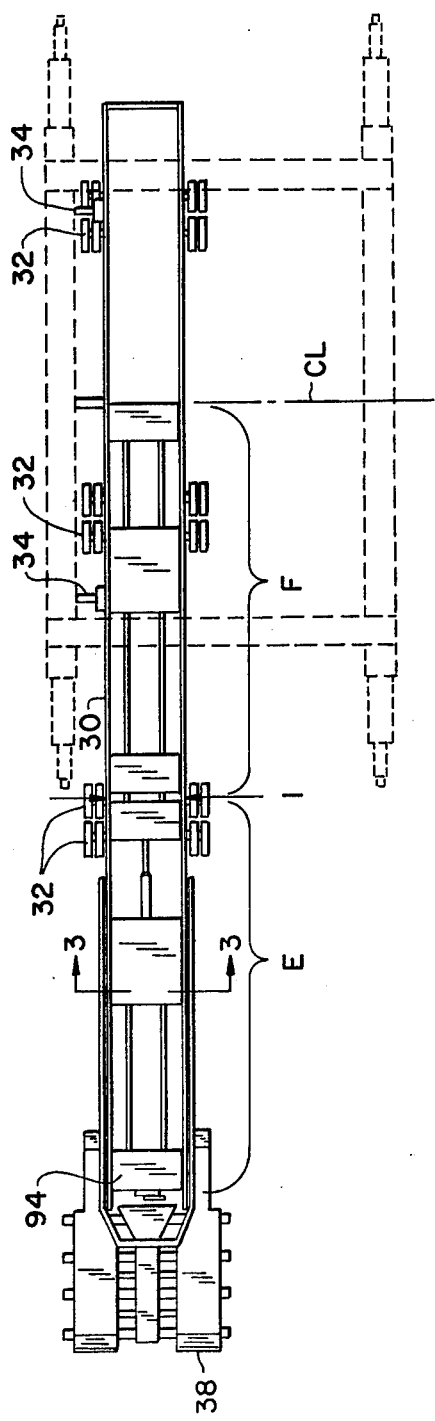
FIG._2.
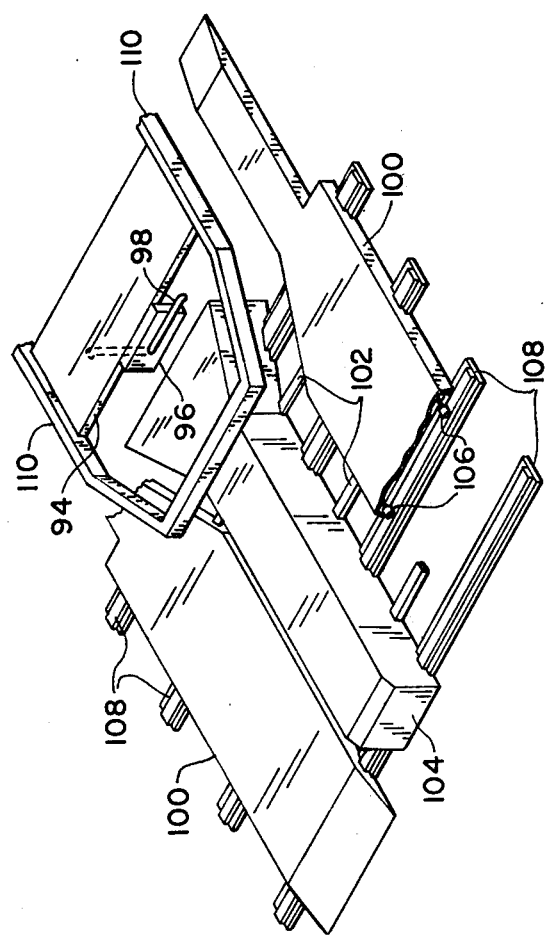
FIG._6.

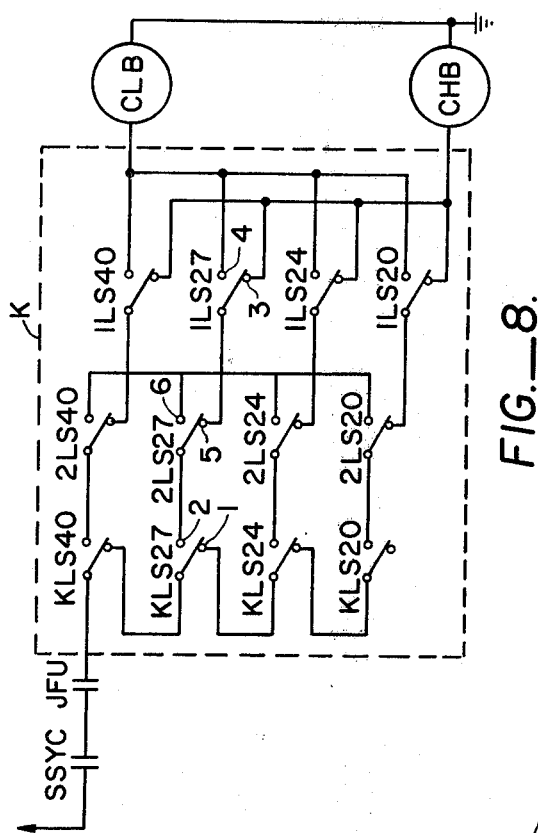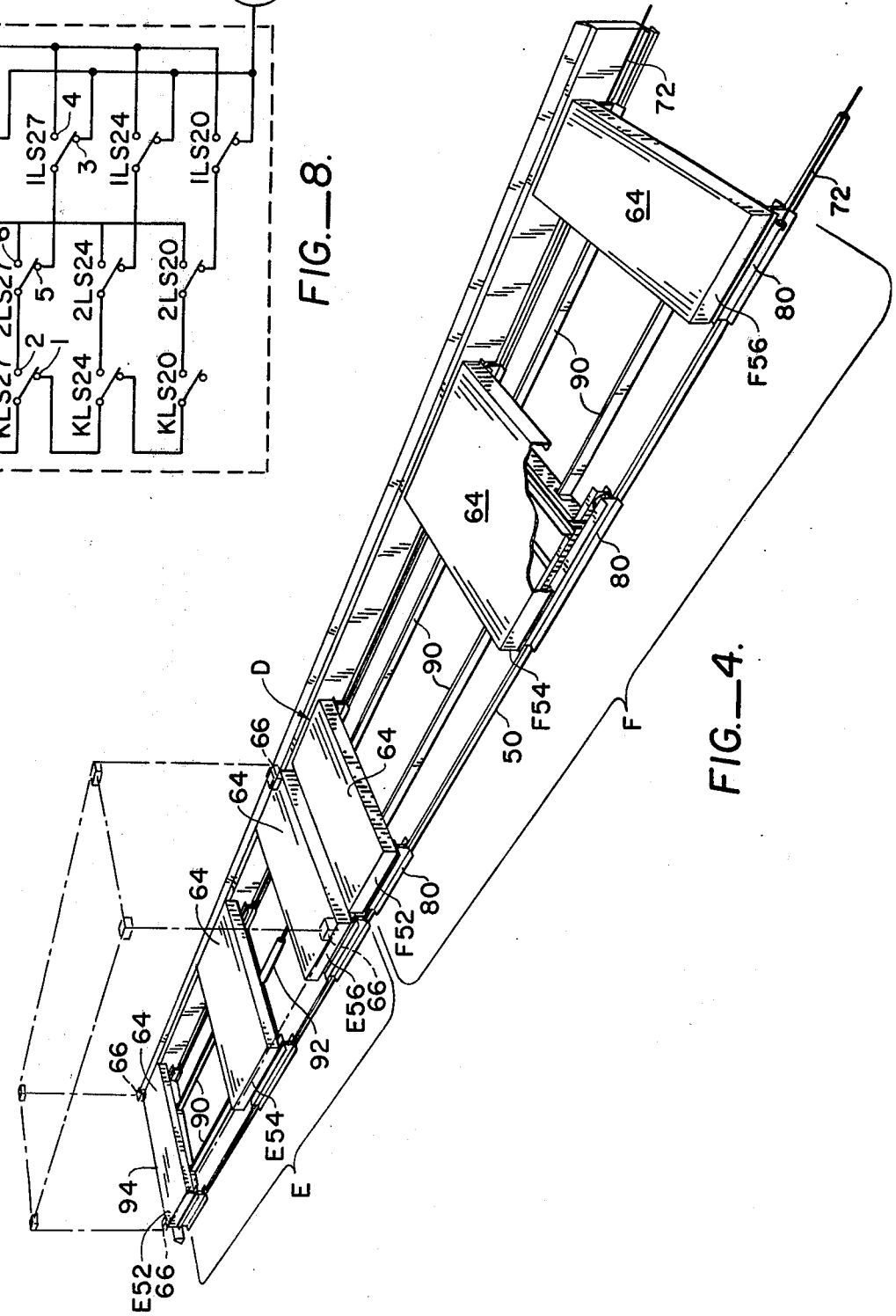

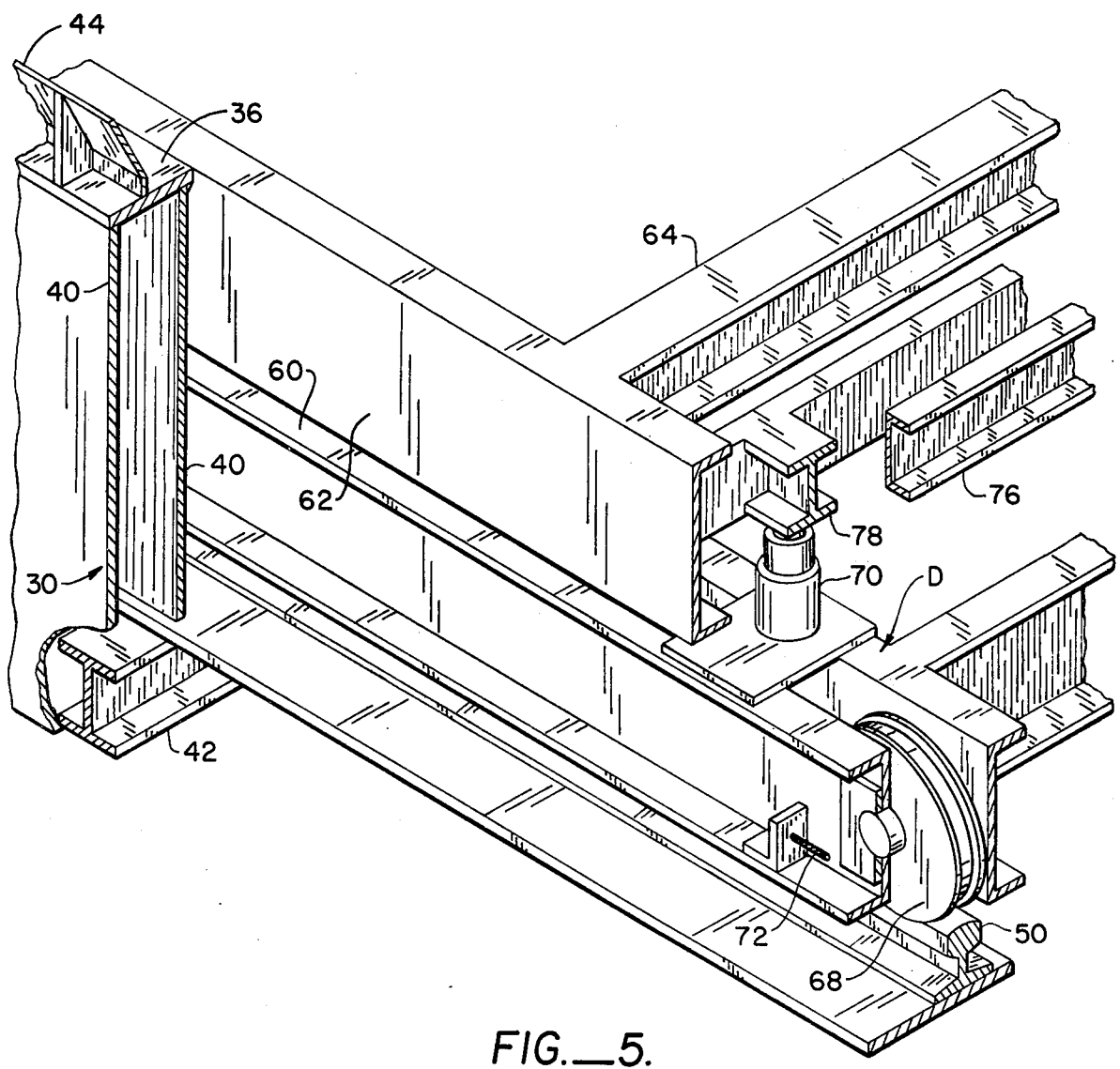
FIG._5.

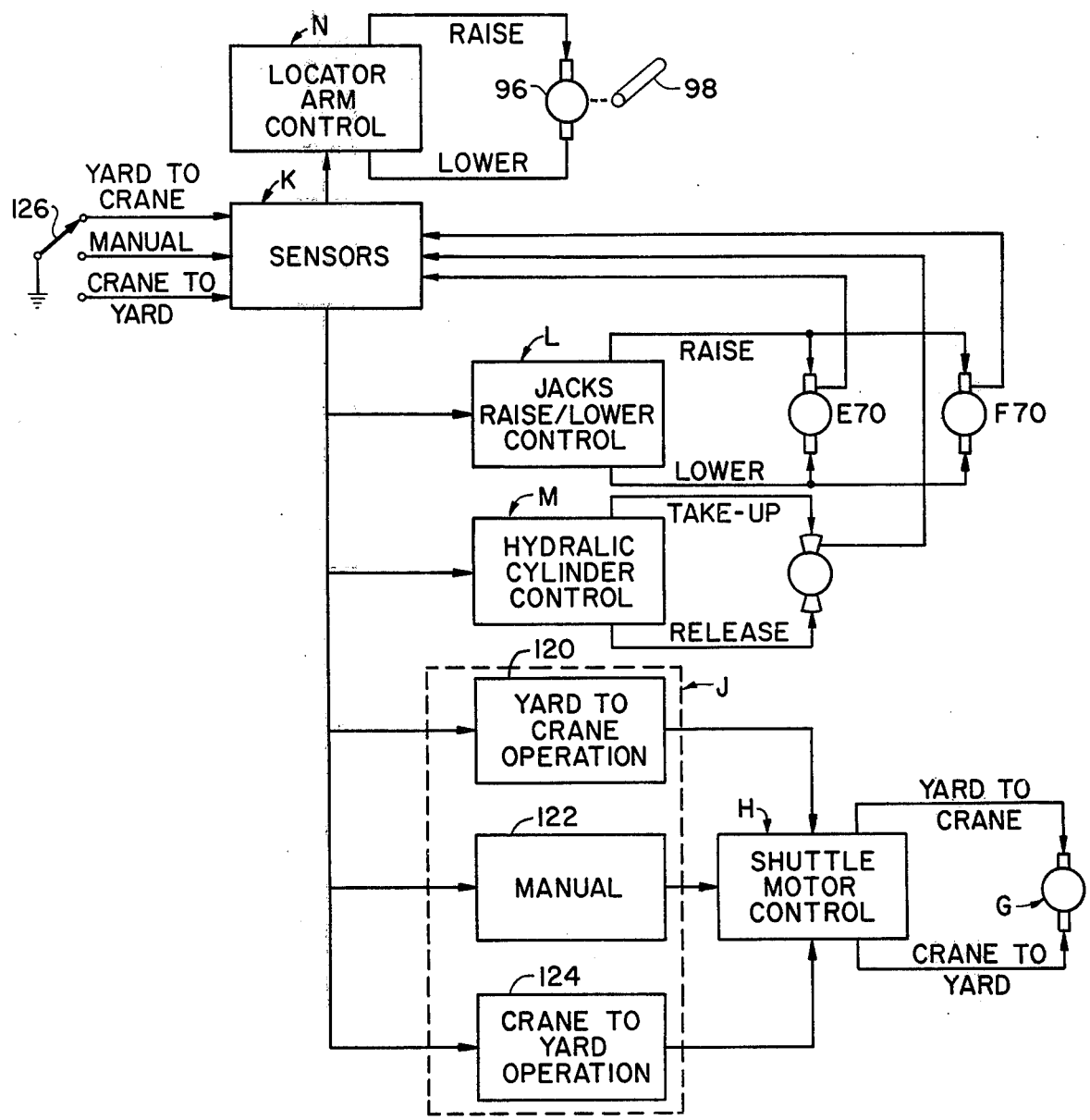
FIG.—7.
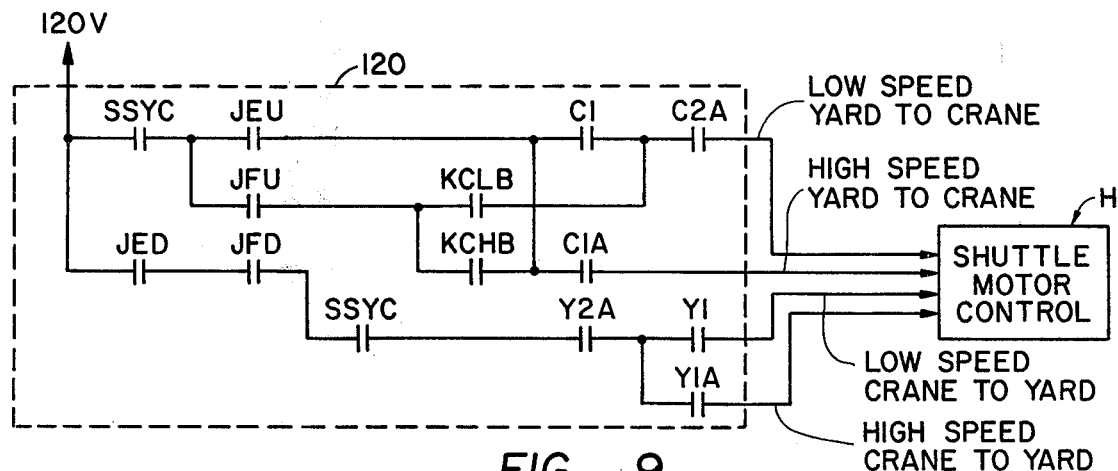
FIG.—9.

CONTAINER CONVEYOR APPARATUS AND METHOD FOR VESSEL LOADING CRANE-YARD INTERFACE

This invention relates to conveyor-type article handling apparatus and specifically to a method and apparatus for conveyance of large containers such as those used on shipboard for transport by container vessels.

STATEMENT OF THE PROBLEM

Container yards are now in wide use for the martialing of containerized cargos to be onloaded and offloaded from vessels. This invention relates to the handling of such containers. Specifically, it relates to the handling of such containers at the interface between a vessel offloading crane and a backup cargo martialing yard. An understanding of the container handling problems between such a vessel loading crane and a martialing yard is necessary to an understanding of this invention.

Cargo onboard ship is loaded within a hold which is provided with numerous cell guides. These discrete cell guides accept containers with the usual requirement for ship stability that the heaviest containers be placed at the bottom, and the lightest at the top to give the transporting vessel a favorable righting moment underway. Naturally, the martialing yard must classify and convey containers to be shipped in anticipation of the ship stability requirements. During vessel offloading, classification by consignee is required.

The interface between the yard classification equipment and the vessel loading crane has heretofore constituted the chief bottleneck in container yards. Typically, where the ship crane has undue delay (as in the handling of hatches or movement between holds and the like), yard classification equipment must wait. Delay results.

Likewise, the yard classification equipment has undue delay (such as with long trips to the consignee stock piling area or long trips to pick up heavier weight containers) equipment must likewise wait.

In short, where either the crane waits on the yard back-up equipment, or the yard back-up equipment waits on the crane, an aggregate of delay occurs. This delay at the interface between the vessel loading crane and the yard classification system affects berth time of the ship and the efficiency of the yard. The entire capacity of the vessel yard system cannot exceed the transmission of containers between the ship offloading crane and the yard classification equipment.

SUMMARY OF THE PRIOR ART

Where the yard consists of individual pieces of equipment moving carriers (such as "straddle carriers" or individual truck "chassis"), attempts have been made to alleviate the vessel loading crane/yard classification equipment bottleneck at the interface. However, at least four factors have contributed to the unavoidable delay of cargo at this point.

First, such vehicles have traffic patterns with resultant traffic conflicts which restrict the number of vehicles which can service a given crane. Usually, these traffic patterns require either an excess of individual operator driven equipment or the crane waiting on the limited number of individual units servicing the crane.

Secondly, such systems require individual operator driven equipment. Such equipment has a higher accident and maintenance rate. Indeed most damage of cargo in transit occurs in the classification yards.

Third, the movement of empty container conveyance vehicles is always required. Commonly, such movement is confined to a loop path which not only consumes valuable dock side space, but brings to a halt all traffic where it is necessary for a container conveying vehicle to stop at any point along the loop.

Finally, any kind of vehicle system uses large amounts of real estate. As real estate bordering on a quay is commonly difficult and expensive to develop, excessive use of real estate is not desired.

In attempts to improve the interface between the yard classification equipment and the ship loading crane, overlapping cranes have heretofore been considered, but not used. In such overlapping cranes, the depending cable suspended spreaders, as well as handled containers, can come into conflict with each other. The cranes must therefore move the spreaders up out of the way or laterally move to avoid interference. Because in such systems the possibility of container and crane conflict and even collision is always present, and indeed these possibilities can be precipitated by high volume container handling situations common to most container yards, systems involving crane overlap have heretofore not been implemented.

The application of conventional conveyors to solve this problem has heretofore been thought of and rejected. Specifically, where endless belt conveyors have been considered, the support of cargo handling containers has been a problem. Such containers are designed for support on blocks mounted at their corners. Endless belt conveyors do not readily adapt to such a support.

More importantly, in an endless belt conveyor the spatial interval between conveyed articles cannot be changed. Moreover, when an article is deposited at one end of an endless belt conveyor, similar and simultaneous removal must occur at the opposite end of the endless belt conveyor. Thus, the onloading and offloading of such a conveyor must be precisely coordinated and no opportunity for a flexible work bank of containers in conveyance is present.

Roller type or belt type conveyors are unsuitable for container handling. Containers typically have such mass that their gravity conveyance cannot be considered. Moreover, since shipboard cargo containers are by convention adapted for support at blocks located only at their corners, support during conveyance on such conveyors remains an unsolved problem.

SUMMARY OF THE INVENTION

The interface between a vessel loading crane and a container handling yard has been discovered to be the ideal location for the maintenance of a work bank of containers in conveyance along a one-way, reversible conveyance path. The conveyance path communicates to a vessel loading crane at one end of the path and apparatus for distributing and classifying the containers in the yard at the other end. Accordingly, a conveyor comprising an overlying support and an underlying shuttle car is disclosed. A shuttle car commutes reversibly along a shuttle car railway under containers supported on the overlying support. The shuttle car operates to selectively raise containers above the support and move containers reversibly and serially between work stations at either end of the conveyor. The work stations at either end of the conveyor are separated by a container storage interval to permit the support stowage of one or more serially conveyed containers between the work stations. Circiut logic is disclosed which actuates the shuttle car to serially convey containers in the desired direction of container flow between the work stations.

The circuit logic causes one work station to assume an offloading status. Any container support on the conveyor is remotely and serially conveyed to the work station having offloading status. Similarly, the circuit logic causes the other work station to assume an onloading status with the preferred serial conveyance of containers on this work station away from the work station and toward the other work station in the offloading status. Containers being serially conveyed in the container storage interval between the work stations form a work bank of containers in conveyance to thereby minimize the incidents of time spent waiting for discrete containers to arrive at the respective work stations for handling.

In the preferred embodiment, the conveyor is adapted to convey containers longitudinally oriented in the direction of conveyance. The conveyor is designed to have a low profile so that it supports and conveys containers at a relatively minimum height above the ground. These features allow such yard classification equipment as a straddle carrier to "straddle" the yard work station of the conveyor to pick up from or deliver containers to the conveyor.

Since containers come in at least four lengths, the conveyor is adapted to determine container length as well as the location, relative to the conveyor of the yard end of the container. Thus, the conveyor is provided with appropriately located sensors which provide the circuit logic with information about the container length and the location of the yard end of the container. This information allows the container to be accurately located along the conveyance path and particularly at the work stations.

To aid straddle carriers in placing containers in proper longitudinal alignment on the conveyor, the yard work station of the conveyor is provided with a straddle carrier guide which helps to center a straddle carrier as it moves into position at the yard work station to deliver a container. The straddle carrier guide includes a pair of ramps, situated in spaced relation to each other and between which lies the yard work station of the conveyor. Attached to each ramp are rail mounted rollers which allow the ramps to slide a slight amount in a transverse direction relative to the conveyor. When the straddle carrier rolls up onto the ramps, their ability to move slightly in a transverse direction, aligns the straddle carrier approximately with the longitudinal of the conveyor. So aligned, the straddle carrier can deposit the container on the yard work station, with the container properly aligned with the conveyor for conveyance to the vessel crane work station.

OTHER OBJECTS AND ADVANTAGES OF THE INVENTION

An object of this invention is to place a work bank of containers in conveyance between a ship offloading crane and yard classification equipment. According to this object of the invention, a single file path is established between two work stations. Containers are conveyed serially between the respective work stations with variable intervals between them. Containers in conveyance between the two work stations form a "work bank" of containers in conveyance.

An advantage of this object of the invention is that the two work stations at either end of the conveyor can function independently from each other. Each work station can receive or discharge containers independently of activity of discharge or reception at the other work station.

A further advantage of the work bank is that the incidence of delay caused by either the yard classification equipment or the ship loading crane is minimized. Where container handling from one work station on either end of the conveyor is delayed, a work bank of containers in conveyance acts as a unit reservoir to or from the remaining work station. Activity at the remaining work station can still be maintained. Efficiency of the vessel loading crane/yard classification equipment interface is improved with increased efficiency of the yard/vessel system.

A further object of this invention is to disclose a conveyor apparatus that is adapted to a one-way reversible path between two work stations with a work bank of containers in transit therebetween. The conveyor includes a static support frame with a shuttle car running on an underlying path underneath the static support frame. The shuttle car is operable to individually raise and transport containers between varying points on the static support frame. By serially conveying containers from a work station at one end where they are deposited, to a work station at the opposite end where they are removed, the shuttle car remotely conveys and maintains a work bank.

An advantage of this aspect of the invention is that the containers on the conveyors are confined to a discrete automated path. Incidence of damage to the containers can be reduced.

A further advantage of this invention is that the support mechanism disclosed herein can be readily adapted to support containers at their conventional support points—blocks located at the bottom corners of the container. Support of the containers at other locations where they are fragile and subject to damage is not required.

Yet another advantage of this invention is that the support frame, in supporting the unit containers, is inert.

A further advantage of this invention is that the underlying shuttle car, in traveling underneath the support frame, has no interference with returning vehicles. Moreover, it can move independently and free of the stored containers on the path. Additionally, movement of the shuttle vehicle is independent and free of cranes or other equipment which are servicing the work stations at any end of the conveyor.

A further object of this invention is to disclose a mechanism for the lengthwise conveyance of containers of varying lengths. Specifically, apparatus is disclosed which locates the yard end of the conveyor and controls the expansion and contraction of the longitudinal dimension of the shuttle vehicle to align the yard end of the container with that of the shuttle vehicle. According to this aspect of the invention, the shuttle vehicle is made with a variable dimension and is provided apparatus for locating the yard end of a container positioned at the yard work station. When containers are handled, the longitudinal of the shuttle vehicle is contracted until the yard end of the container is located and the yard ends of the container and shuttle are aligned.

An advantage of this aspect of the invention is that containers may be received by or distributed to yard classification equipment, such as straddle carriers, which can longitudinally convey the containers. No undue handling is required at the yard work station to properly position the container for pickup by the straddle carrier or conveyance of the container after it has been deposited on the conveyor by the straddle carrier.

A particular advantage of this invention is the ability of the shuttle conveyor to accurately position a container for vessel crane pick-up with the lengthwise centerline of the container in line with the vessel crane centerline regardless of container length. This is accomplished by means of sensing equipment and control circuitry.

Yet a further object of this invention is to disclose circuit logic for the serial conveyance of containers between work stations at opposite ends of the conveyor.

Other objects, features and advantages of this invention will become more apparent after referring to the following specification and attached drawings.

BRIEF DESCRIPTION OF THE DRAWINGS

FIG. 1 is a perspective view of a vessel crane, a straddle carrier, and the conveyor of this invention illustrating the use of the conveyor as a work bank between the vessel crane and the yard classification equipment (e.g., straddle carrier);

FIG. 2 is a top plan view of the conveyor of the present invention;

FIG. 3 is a sectional view of the conveyor of the present invention taken along lines 3—3 of FIG. 2;

FIG. 4 is a perspective view of the shuttle car used to convey containers along the conveyance path between the vessel crane and the yard classification equipment;

FIG. 5 is an enlarged, partial perspective view and detail illustrating the lifting mechanism of the shuttle car and the track of the conveyor along which the shuttle car runs to impart an understanding of how the shuttle car operates relative to the conveyor support frame;

FIG. 6 is a partial perspective view of the yard end of the conveyor of the present invention, illustrating the straddle carrier guide used to longitudinally center the straddle carrier relative to the conveyor;

FIG. 7 is a block diagram illustrating the control circuitry of the shuttle car motor;

FIG. 8 schematically illustrates a selected portion of the sensor-relay configuration used in the control circuitry of FIG. 7; and FIG. 9 is a schematic circuit illustration showing contacts of particular relays arranged as a combinational logic circuit to determine the direction of shuttle motor operation in response to conditions sensed by the sensors of FIG. 8.

DETAILED DESCRIPTION OF THE PREFERRED EMBODIMENT

Referring now to the Figures, in particular FIG. 1, there is illustrated use of conveyor A as a work bank interface between vessel crane B and yard classification equipment, shown here as straddle carrier C. For ease of explanation and understanding, the conveyor A of the present invention is shown with a yard work station 12 and vessel work station 16 separated by only one intermediate transit station 14. However, as will become apparent as the description of the present invention continues, any number of intermediate transit stations can be used. The number of intermediate transit stations of any particular conveyor of the present invention would be limited by such factors as the length of the work bank interface needed in light of the requirements of the vessel-loading crane, the container yard, and the yard classification equipment. For example, the time required to handle containers by either the vessel-loading (or unloading) crane or yard classification equipment may be such that only one intermediate transit station is required, as shown herein.

Referring specifically to FIG. 1, conveyor A is shown conveying containers received from the yard classification equipment—e.g., straddle carrier C—for pickup by crane B. As can be seen, straddle carrier C has just deposited container 20 upon conveyor A at yard work station 12. Crane B has removed from work station 16 container 22 which is now being lowered into the hold 26 of vessel 24. Concomitant with the handling of container 22 by vessel crane B, conveyor A is shown shuttling container 28 from transit station 14 to the now-empty work station 16 for pickup by the crane B. Once container 28 has been properly placed at vessel work station 16 for pickup by the crane B, container 20 can then be conveyed to transit station 14 from yard work station 12, leaving the latter clear for deposit of another container.

Conveyor A is shown as including a support frame 30 which defines the conveyance path and the work stations 12-16. As will be explained more fully below, frame 30 supports the rails upon which shuttle car D travels. Mounted to the support frame 30 are wheels 32 which allow conveyor A to "track" the vessel-loading crane when attached thereto by mechanical connection 34. Alternatively, wheels 32 allow the conveyor to be moved from crane to crane with relative ease.

Support frame 30 dictates the height above ground at which containers being conveyed and stored by the conveyor will be situated. It is presently contemplated that the preferred embodiment of the conveyor of the present invention will adapt to receive containers from all types of yard classification equipment, including straddle carriers. Thus, the support surface 36 (FIG. 5) of the support frame 30 upon which containers will be disposed should be of sufficient height above the ground to allow a straddle carrier to "straddle" the yard work station 12 to pick up therefrom or deposit containers.

Adjacent the yard end of conveyor A is straddle carrier guide 38. As will be discussed more fully below, carrier guide 38 functions to facilitate longitudinal alignment of a straddle carrier and the conveyor by being capable of some transverse movement relative to the conveyor.

As can be more easily seen in FIG. 3, support frame 30 includes side members 40, 40 held in parallel spaced-apart position by underlying cross member 42. The horizontally upper edge of each side member 40 defines the support surface 36 upon which containers are set. To ensure longitudinal alignment between conveyor A and containers positioned thereon, a container guide 44 borders each support surface. Inclined faces 46 of the container guides 44 help guide placement of a container onto the support surface 36 of the conveyor.

Referring to FIGS. 3-5, cross member 42 of the support frame 30 is shown supporting a pair of spaced, parallel rails 50 upon which shuttle car D rides. Shuttle car D will be seen consisting of two shuttle sections E and F, each comprising three container carriages E52—

E56 and F52–F56, respectively. In the preferred embodiment of this invention, shuttle section E reversibly conveys containers between work stations 12 and 14 while shuttle section F conveys containers between stations 14 and 16. Each carriage E52–E56 and F52–F56 consists of two frames. A first subframe 60 underlies a second subframe 62 which supports conveying platforms 64. The container conveying platforms contact and lift the discrete cargo containers at their corner blocks 66 during shuttle of the respective containers. As will hereinafter be explained more fully, raising and lowering of frame 62 relative to frame 60 of each carriage moves the container conveying platforms into and out of contact with the corner blocks 66 of the respective containers. By raising these corner blocks small distances above the support surface 36 of frame 30, the raised container is then ready for longitudinal transport.

Subframe 60 of each carriage E52–E56 and F52–F56 typically rides upon rails 50 at wheels 68. Typically, wheel 68 is journalled to subframe 60. In its journalling to subframe 60, this will supply the bottom support for jack 70. Shuttle occurs through motor-connected drive cables 72 which interconnect shuttle car D and shuttle motor G (FIG. 7) through a conventional receiving arrangement (not shown).

Each of the respective container conveying platforms 64 are supported by U-shaped cross beams 76 which are interconnected by I-beam 78. Jack 70 is supported at its lower end on subframe 60. It can readily be seen that vertical expansion and contraction of jack 70 will raise and lower the second and overlying frame 62 as well as the container conveying platform attached thereto. Such raising and lowering of the second and overlying frame 62 will cause the container conveying platforms to come into and out of contact with the respective corner castings 66 of the discrete containers.

Although not specifically shown, it is evident that jacks 70 comprise a four-point jacking mechanism for raising or lowering the platforms 64 of each respective carriage; that is, each jack is located proximate one of the four corners of each carriage.

Jacks 70 of shuttle section E operate independently of the jacks 70 of shuttle section F, although the jacks of each shuttle section operate in unison with each other. This allows one or both shuttle sections to raise a container above the support frame 30 for conveyance. Additionally, it is presently contemplated that jacks 70 will be of the ball-screw variety and actuated so that they provide simultaneous and equal lifting of the respective support platform frame 62.

When frame 62 is elevated, the respective container conveying platform comes into contact with the inner half of container casting 66 (FIG. 4). In this position, casting 66 is lifted and with it the container. By lifting the container a small distance above the frame support surface 36, the containers can be shuttled with the shuttle car D. Once the container is shuttled to its desired transfer position (that is, work station 12, work station 16, or the intermediate transit station therebetween), the container support frame 62 is lowered, the outward half of the corner castings 66 will come into contact with the container support surface 36, and the container will be supported at rest. Moreover, the shuttle car will be free to commute underneath the resting container. It can then proceed to position where it may handle and transport other containers independently of the supported and resting container on the conveyor.

Carriages F52–F56 of shuttle section F are held in fixed relation to one another by tow bars 90, which are attached to and interconnect the subframes 60 of each carriage. The carriages (of shuttle section F) are spaced relative to one another to engage the four corners of containers of varying lengths and thereby appropriately lift the container for conveyance. In the container industry, containers are typically eight feet wide, eight to ten feet in height, and of varying length. As has been pointed out, seagoing containers are typically 20 feet, 24 feet, 27 feet, or 40 feet in length. Moreover, shipboard cargo containers are by convention adapted for support at blocks located only at their corners.

Thus, in order to accommodate lifting containers of such varying lengths, the spacing between carriages F52–F54, as well as the longitudinal length of each, should be such so as to lift containers 20, 24, and 27 feet in length at their corners. The spacing between and longitudinal lengths of carriages F54 and F56 should be dimensioned to accommodate lifting containers 40 feet in length.

Like those of shuttle section F, carriages E52 and E54 are held in fixed, spaced relation relative to one another by tow bars 90. However, carriages E52 and E54 are connected to carriage E56 by a hydraulic adjustable tow bar 92. Hydraulic tow bar 92 allows shuttle section E to contract and expand. This last-mentioned feature, in turn, provides the shuttle with the capability of vertically aligning the yard end 94 of the shuttle with the yard end of a container resting on the support frame 30.

Attached to the yard end 94 of carriage E52 is a motorized rotating stop 96 with locating arm 98 in one of two positions, illustrated in FIG. 3—horizontal and vertical.

Turning now to FIG. 6, the construction and function of straddle carrier guide 38 will now be described. The straddle carrier guide is shown as including a pair of spaced-apart wheel ramps 100 interconnected by connector struts 102. Situated between the wheel ramps 100 is guide centerpiece 104 through which struts 102 extend to interconnect the wheel ramp pair. Typically, wheel ramps 100 are provided with rollers 106 which are mounted to allow transverse movement of the ramps on foundation straps 108. The foundation straps are rigidly attached to the bottom of guide centerpiece 104.

Spring-mounted wheels (not shown) are attached to the guide centerpiece 104 to provide the capability of transporting conveyor A with carrier guide 38 attached as a complete assembly. This spring mounting of the centerpiece to the wheels (not shown) should provide sufficient bias support to allow a clearance between the foundation straps 108 (attached to the bottom of the centerpiece) and the ground surface. When, however, a straddle carrier rolls upon the wheel ramps 100, the weight of the straddle carrier will overcome the support bias of the spring mounting (not shown), to allow the foundation straps to be set firmly on the ground surface.

The straddle carrier guide operates to longitudinally align and center the straddle carrier relative to the conveyor. When a straddle carrier rolls upon the wheel ramps 100 and continues moving toward the conveyor, the side members or legs of the straddle carrier will come into contact with fenders 110 of the conveyor. If the straddle carrier is not quite aligned with the conveyor, the straddle carrier-fender contact will impart a lateral force to the straddle carrier and, in turn, the wheel ramps 100. This lateral force causes transverse movement of the roller-mounted wheel ramps and the straddle carrier which, in turn, effects longitudinal alignment of the straddle carrier relative to the conveyor.

Having set forth the apparatus and function of conveyor A, the circuit logic of this invention can be discussed. First, the position and function of all sensors will be set forth. Secondly, and with reference to the schematics illustrated in FIGS. 7-9, the schematic configuration of the circuit logic will be described. Finally, the operation of the circuit logic will be set forth to show the reversible one-way serial path established by conveyor A between the vessel crane B and the yard classification equipment, represented by the straddle carrier C.

Conveyor A is capable of operating in one of three selectable modes, two of which are automatic. All modes provide for lengthwise transport of the containers. The automatic modes provide for container transport from the yard classification equipment to crane B or, alternatively, from crane B to the yard classification equipment.

It should be evident, however, that automatic operation of shuttle car D will require some information about the container to be transported. For example, most vessel-loading cranes, such as crane B (FIG. 1), use spreaders 21 which engage spreader-receiving apertures (not shown) located at the upper corner blocks of the container to be transported (e.g., container 22 of FIG. 1). If the center of the container to be picked up by crane B is not quite longitudinally aligned with the crane boom 23, spreaders 21 will have to be moved laterally in order to effect a spreader-container connection. Much time and effort can be saved if the container to which the spreaders are to be attached is positioned for crane B pick-up so that this lateral movement is minimized. However, before conveyor A can properly position a container at work station 16 (and thereby minimize lateral movement of the spreaders for attachment to the container), conveyor A must know the length of the container and the distance the container must be conveyed.

In addition to container positional and length information, automatic container conveyance requires knowledge of shuttle car position, the direction containers are to be transported, and which (work or transit) stations bear containers and which are empty. Moreover, shuttle car D movement from one station to another to pick up a container for conveying must be made with container conveying platforms 64 in a lowered position to avoid collision between a container and the raised platforms. Thus, position of the container conveying platforms must be known and controlled.

Finally, before a container is moved into the vessel crane work station 16, it must be known whether there is sufficient vertical clearance above the work station for the container.

This and other information as may be required for automatic container conveyance can be obtained by a number of commercially available sensor-type devices. For example, proximity switches of the type that are activated by the presence of conducting metal may be used. Photoelectric controls are also available such as the "Eye-Ball" light operated limit switch manufactured by Xercon, Inc. (Model LO-SP, sunproof modulated system) which detects the presence or absence of a container at a particular work or transit station.

However, it is presently contemplated that information utilized by the electrical circuits used to control conveyor A operation will be obtained through the use of limit switch sensors. This type of sensor has a pivotally attached flat steel lever arm which pivots to close (or open) a set of contact points when contacted by an object; the presence or absence of the object in the proximity of the particular limit switch sensor is thereby indicated. The sensors and their placement to detect objects are matters of choice, well within the knowledge of those skilled in the art, and therefore specifically not shown.

Turning now to FIG. 7, there is schematically illustrated, in block diagram form, shuttle car motor G operably connected to shuttle motor control H. Typically, shuttle motor control H would include reversing motor starter circuitry (not shown) such as that manufactured by General Electric Company (Type CR209). Such circuitry would provide the proper amount and polarity of electrical power used to control the speed and direction of shuttle motor G. Conditions of operation (e.g., high speed or low speed and direction) are supplied to the shuttle motor control by decisional circuit J consisting of logic blocks 120-124.

Information utilized by decision circuit J to control conditions of operation of shuttle car motor G (and, therefore, shuttle car D) is provided by sensors K. As discussed above, sensors K include the appropriate sensor limit switches and other types of sensors as may be utilized to sense or otherwise determine position of the shuttle car, length and position of containers, and other information needed for automatic operation of conveyor A. Sensors K also receive information concerning the selected operational mode of the conveyor from selector switch 126, which would typically be located in the crane B operator's area.

Sensors K are also electrically coupled to the jacks (raise/lower) control L and hydraulic cylinder control M. Jacks control circuitry L provide the appropriate electrical power to jack motors E70 or F70 for raising and lowering the appropriate group of container support platforms 64 of shuttle sections E or F, respectively, of the shuttle car D.

Having described the major circuit groups that operably control operation of the shuttle car, overall operation of conveyor A to convey containers lengthwise from one work station to another may now be discussed. Assume, for the purposes of this discussion, that straddle carrier C has just deposited a container 20 on conveyor A at work station 12; the conveyor is in the yard to crane operational mode. The conveying operation is commenced upon recognition of three conditions. First, straddle carrier C must have moved off the straddle carrier guide 38 so that it will not hinder the lifting of the container to be conveyed by shuttle car D. Second, the transit station 14 must be empty and able to receive container 20. Third, shuttle car D must be located so that shuttle section E is positioned at work station 12, beneath the container.

With these conditions recognized as being satisfied, operation of conveyor A commences by rotation of locator arm 98 to a vertical position, illustrated in phantom in FIG. 6. Once arm 98 is vertically positioned, the hydraulic cylinder 92 is activated to draw carriages E52 and E54 toward carriage E56 to vertically align the yard end 94 of the shuttle car with the yard end of container 29. This vertical alignment is achieved when the locator arm 98 makes contact with the yard end of the container. Positional information about container 20 has now been obtained. Specifically, the position of the yard end of the container, relative to the conveyor is now established.

With container position obtained, shuttle section E jacks 70 are then commanded to raise the respective container conveying platforms 64. Container 20 is thereby lifted from support surface 36 of frame 30. Shuttle car D is then commanded to begin movement along rails 50 toward crane B until appropriately placed sensors (not shown) indicate transit station 14 is nearly reached. Movement of the shuttle car is slowed but continued until the yard end 19 of container 20 is aligned with a predetermined index point I (FIG. 2). Again, container-index point alignment will be sensed through appropriately placed sensors (not shown). The shuttle car is stopped and shuttle section E jacks 70 are lowered, placing the container at rest on the support frame 30. Locator arm 98 is then rotated to a horizontal position, hydraulic cylinder 41 is activated to extend shuttle section E and shuttle car D is then commanded to "home" to return shuttle section E to yard work station 12.

The container remains positioned at transit station 14 with its yard end aligned at index point I until vessel loading station 16 is indicated as being clear. Upon such indication, jacks 90 of shuttle car section F raise, bringing the container conveying platforms into contact with and raising the container. Simultaneously, appropriately placed sensors (not shown) on the container conveying platforms of shuttle car section F determine the container length. Knowing the position of the container, i.e., alignment with index I, and the length of the container, the conveyor can now transport the container to, and with relative accuracy, position the lengthwise center of the container at center line point CL (FIG. 2) of vessel loading crane B. It can be readily verified that the distance the container must be conveyed to accurately line up the lengthwise center of the container with the center line CL is $D - L/2$, where D is the horizontal distance from index point I to center line CL and L is the length of the container; as can be seen, this information is available.

Shuttle car D conveys the container to vessel work station 16, jacks 90 lower the container to place it upon the support frame 30 and the shuttle car again "homes". The container is now positioned for pickup by vessel-loading crane B. In particular, alignment of the lengthwise center of the container with the crane center line CL minimizes the required lateral movement of spreaders 21 to effect attachment with the container.

The above operation is substantially the same for crane-to-yard conveyance operation. Several differences are worth noting, however. First, the vessel-loading crane positions the container on conveyor A so that the container center line is in substantial alignment with crane center line CL. Thus, container positional information (obtained by appropriately placed sensors [not shown]) is known at the outset. The container is conveyed to transit station 14 and appropriately aligned with index point I of the conveyor. The shuttle car shifts so that shuttle section E then lifts and conveys the container to the yard work station 12 where it is placed on the support frame for pickup by the yard classification equipment.

Having described the overall operation of conveyor A, the specific sensing and decisional circuitry that control automatic operation of conveyor A can now be described with reference to FIGS. 7-9.

The logic circuits 120, 122 and 124 that comprise decisional circuit J each include a number of relays, one or more being electrically coupled to one or more of the limit switch sensors K. For example, in FIG. 8 there is schematically illustrated a few of the limit switch contacts associated with sensors K interconnected in combinational logic form to apply 120 volt AC power to, and thereby operate, relays RCLB and RCHB. It is to be understood that each limit switch contact illustrated is part of a corresponding limit switch described above. It is movement in FIG. 8 of a particular limit switch arm that causes the corresponding limit-switch contact to make or break particular circuits in which it is used. Thus, movement of limit switch blades KLS20-KLS40 would indicate detection of the length of the container to be conveyed. The limit switch sensors corresponding to limit switch contacts KLS20-KLS40 are appropriately located on shuttle section F support platforms 64 so that when a container is lifted off the support frame by the platforms, container length is determined. Similarly, limit switch contacts 1LS20-1LS40 indicate detection of the position of shuttle car section F relative to the vessel crane loading station 16 for slowing down the shuttle car. Limit switches 2LS20-2LS40 are positioned along the conveyor to determine when the center line of the container is aligned with vessel-loading crane B center line CL.

Also illustrated in FIG. 8 are relay contact points SSYC, which are caused to be closed for yard-to-crane operation, and relay contact points JFU, which are closed when the jacks 70 of shuttle car section F are determined to be fully raised. Closure of these (and other relay contact points) means that an electrically conductive path is established by the relay contact in question.

As will be described more fully below, the relay and limit switch circuitry illustrated in FIG. 8 operates to provide 120 volt AC power to the relays to cause closure of their respective contact points KCLB and KCHB, illustrated in FIG. 9.

FIG. 9 is a schematic representation of the relay contacts that comprise the combinational logic relay circuitry of logic circuit 120. Similar relay circuit configurations are used for logic circuits 122 and 124 as well as the circuits used to implement jacks control L, hydraulic control M, and locator arm control N. Since the circuit design used in these logic circuits may be easily deduced from the following explanation of FIGS. 8 and 9, they are not shown.

Closure of any particular relay contact of FIGS. 8 and 9 will indicate the following:

SSYC=yard-to-crane conveyance operation selected;

JEU or JFU=jacks 90 of shuttle car sections E or F, respectively, are in the full raised position;

JED or JFD=jacks 90 of shuttle car sections E or F, respectively, in the full down position;

KCLB or KCHB=discussed above;

CL=shuttle car has reached slowdown point for shuttle car travel in the crane direction;

Y1=shuttle car has reached the slowdown point for shuttle car travel in the yard direction;

C1A or Y1A=slowdown points have not yet been reached by the shuttle car when traveling in the crane or yard direction, respectively, allowing high-speed travel;

C2A = yard end 94 of shuttle section E not at (or aligned with) index point I;

Y2A = shuttle car not at "home" position (i.e., shuttle section E of the shuttle car not positioned at yard work station 12.

With the use of FIGS. 8 and 9, and the above-identified definitions of the relay contacts shown, automatic control of shuttle motor G to drive shuttle car D for transporting containers from the yard classification equipment to vessel crane B may now be described.

Assume initially that yard-to-crane operation has been selected via selector switch 126, causing closure of relay contacts SSYC; that a container has been placed on conveyor A at yard work station 12; and that straddle carrier C has removed itself from the ramps 100 of the straddle carrier guide 38. Assume further that the length of the container is 27 feet and that the intermediate transit station 14 is empty. These conditions are sensed by the appropriate sensors K and indicated to the jacks control circuitry L. Jack motors E70 (FIG. 7) are activated by the jacks control circuitry to raise the support platforms 64 of shuttle section E to raise the container. It should be noted that there is no need to raise the support platforms of shuttle section F. Thus, jack motors F70 are not activated by the jacks control circuitry.

Once jacks 70 of shuttle section E have reached their fully raised position, an appropriately placed limit switch (not shown) will cause closure of relay contacts JEU. As FIG. 9 illustrates, 120 volt AC power is now supplied to the shuttle motor control H by the conductive electrical path created by closed relay contacts SSYC, JEU, and C1A, at the high-speed yard-to-crane operation input. Shuttle motor control H selects the proper electric power to be applied to shuttle motor G which, in turn, initiates travel of shuttle car D from work station 12 and toward crane B.

High-speed movement of the shuttle car D continues until the shuttle car reaches and activates the appropriately placed sensor (not shown), indicating that shuttle section E (and the container it is conveying) is approaching transit station 14 and causing relay contacts C1A to open and C1 to close. An inspection of FIG. 9 will show that the electrical path from the 120 volt AC power to the high-speed yard-to-crane input of shuttle motor control H is broken. In turn, however, communication is now established between the 120 volt AC power and the low speed yard-to-crane input via closure of relay contact C1 (It will be remembered that relay contacts C2A remain closed until the yard end of shuttle section E, and the container yard end being conveyed, is positioned at index point I of conveyor A.

The shuttle car continues at low speed until the container is aligned at index point I. At this time relay contacts C1 open and the shuttle car movement ceases. A similar operation occurs in the relay circuitry of jacks control circuit L to activate jack motors E70 to lower, placing the container at rest on the support frame 30.

When jacks 70 of shuttle section E are down (again, sensed by an appropriate limit switch) closure of relay contacts JED will be effected to cause 120 volt AC power to be applied to the high-speed crane-to-yard input of shuttle motor control H by the electrical path of closed relay contacts JED, JFD, SSYC, Y2A, and Y1A. The shuttle car returns to its "home" position with shuttle car section E positioned beneath the yard work station 12 of the conveyor. At this time, the appropriate circuitry of sensors K will notify jacks control circuitry L that a container is positioned at the intermediate transit station 16, causing jack motors F90 (FIG. 7) to raise the container support platforms 64 of shuttle section F.

When the lifting platforms come into contact with the container, limit switch KLS27 (FIG. 8) will be caused to break contact with point one and make contact with point 2. 120 volt AC power is applied to the relay RCHB by the closed relay contacts SSYC and JFU as well as the limit switches position (positioned as shown in FIG. 8) KLS40, 2LS27 and 1LS27. Shuttle motor control is provided with a high-speed yard-to-crane command via (FIG. 9) relay contact closures SSYC, JFU, KCHB, and C1A. The shuttle car commences to travel toward the vessel-loading station 16.

When the speed reduction limit switch, for a 27-foot container is reached, limit switch blade 2LS27 will be moved upward (as viewed in FIG. 8) to establish contact with point 4 of the switch. Reference to the Figs. will show that AC power is now removed from relay RCHB which, in turn, causes relay contacts KCHB to open and remove 120 volts AC from the high-speed yard-to-crane input of shuttle motor control H. However, power is now applied to relay RCLB via relay contacts SSYC, JFU, and limit switches KLS40, KLS27 (now making contact with point 2), 1LS27 (now making contact with point 4), which causes closure of relay contacts KCLB. Shuttle motor control is now provided with a low speed yard-to-crane command via relay contact closures SSYC, JFU, KCLB, and C2A.

Finally, the shuttle car will reach the limit switch that indicates alignment of the center lines of the conveyed 27-foot container and the vessel-loading station 16, causing limit switch 2LS27 to establish electrical contact with point 6. Electrical power is thereby removed from relay RCLB which causes the relay contact points KCLB to open. Travel of the shuttle car and the container are terminated. Jacks control circuitry L will take over to lower the container upon the support frame where it will rest until picked up by the vessel-loading crane B. Once the jacks are down, relay contacts JFD will close and the shuttle car will again be commanded to travel back to its "home" position by applying the 120 volt AC to shuttle motor control H via closed relay contacts JED, JFD, SSYC, Y2A, and Y1A (substituting Y1 for Y1A when the slowdown position is reached). It may easily be verified, using FIGS. 6–8 and the relay closure definitions above, that the circuitry of logic circuit 120 will direct operation of shuttle motor G, and shuttle car D, so that automatic transport of containers to the yard work station is effected, with priority given to keeping a container at the yard work station (for crane-to-yard operation).

We claim:

1. Apparatus for conveying containers between a vessel crane for loading and unloading containers of at least a first or a second predetermined length from a vessel and the yard classification equipment for distributing containers to and from a container handling yard, the apparatus comprising:

a pair of elongate support members extending along a single file conveyance path including a first work station underlying said vessel loading crane, a second work station at the remote end of said support member and an intermediate support for the support of at least one container between said work stations;

vehicle means underlying the support members and any containers resting thereon for running reversibly along said support members between the work stations, the vehicle means including lifting means for raising said containers from a support position on said support members; and means for moving the vehicle means between said work stations along said single file conveyance path for the movement of said containers on said path over said support members, including first circuit means for determining movement on said path as a function of the length of the container being conveyed.

2. Apparatus of claim 1, including means for locating a yard end of containers being conveyed from said second work station to said first work station.

3. Apparatus of claim 1, wherein the moving means includes means for directing the vehicle means to position the containers, conveyed from the second work station, in alignment with a predetermined point proximate the intermediate support.

4. Apparatus of claim 1, wherein the moving means includes second circuit means for determining the length of said containers.

5. Apparatus of claim 1, wherein the moving means includes second circuit means for determining the length of said containers when raised from the support position for conveyance.

6. A conveyor for lengthwise conveyance of containers across the interface between a vessel crane and a container handling yard, comprising:

a support frame defining a conveyance path between a first work station and a second work station with at least one transit station therebetween and having a support surface that supports a container in relative longitudinal alignment with the frame, the frame being configured and dimensional to accept deposit of or provide for pickup of a container at the second work station by a straddle carrier;

means mounted proximate the second work station for longitudinally aligning the straddle carrier relative to the second work station when the straddle carrier moves into proximate relation with the second work station to pick up or deposit a container; and shuttle means positioned to travel the conveyance path defined by the support frame for transporting at least individual ones of the containers along said conveyance path, the shuttle means including lifting apparatus for raising the container from the support surface of the frame, holding the container in the raised position during transport of the container, and for lowering the container to the support surface.

7. The conveyor of claim 6, wherein the aligning means includes a pair of elongate, spaced, wheel-receiving ramps.

8. The conveyor of claim 7, wherein the aligning means includes a number of flat roller-receiving members mounted thereto; and each one of the wheel-receiving ramps has attached a plurality of roller means for rolling engagement with and transverse travel along the flat roller-receiving members.

9. The conveyor of claim 6, wherein the support frame includes rail elements mounted thereto; and the shuttle means includes a shuttle vehicle having wheel members mounted thereto for engaging and traveling along the rail elements, the rail elements being situated relative to the support frame and support surface thereof to constrain travel of the shuttle vehicle along the conveyance path and to allow the shuttle vehicle to pass beneath the container when said container is at a support position on the support frame.

10. The conveyor of claim 6, wherein at least the support surface of the first and the second work stations include a pair of opposed, spaced guide members, each guide member having a surface that is inclined away from the support surface and the opposing guide member, the guide members being adapted to guide and longitudinally align the container as it is set onto the support surface of the first and the second work stations.

11. A process of length-wise conveyance of containers of different lengths in the interface between a vessel loading crane and yard classification equipment comprising the steps of:

providing a single file conveyance path having a first work station underlying said vessel loading crane and a second work station communicated to the yard classification equipment at the other end of said path;

providing an underlying support along said single file conveyance path for the support of one or more containers between and on said work stations at either end of said path;

providing apparatus to convey containers deposited at one of said work stations to the remaining said work station by determining the length of the container to be conveyed, positioning the conveyor apparatus relative to said container length, lifting containers above said support along said one-way conveyance path, said apparatus including means for determining the location of the end of said container nearest the yard; and conveying said lifted containers in a direction parallel to their lengths between said work stations along and over said support to convey to said other work station any container on said path and conveying remaining container on said path to a storage position juxtaposed to any container at said other work station to create a work bank of containers in conveyance between said work stations.

12. Apparatus for reversibly conveying containers of varied lengths lengthwise between a crane for loading and unloading of vessel and yard classification equipment for distributing containers to and from a container handling yard, comprising:

a support frame defining a single file support and conveyance path between a first work station adapted to underlie the vessel crane, a second work station at the remote end of the support frame, and a transit station for support of at least one container between the first and second work stations;

a shuttle vehicle for travel reversibly along the support frame and beneath any containers being supported by the support frame, the shuttle vehicle including a first section and a second section interconnected by means of moving the first section in a direction of the conveyance path relative to the second section;

lifting means mounted to the shuttle vehicle for raising and lowering the container from and to a support position on the support frame;

means coupled to the conveyor for locating a prdetermined transverse plane of the container supported by the support frame;

motor means for effecting movement of the shuttle vehicle along the conveyance path defined by the support frame; and command means for synchronous control of the motor means, the locating means, the lifting means, and the section moving means, the command means including first circuit means for controlling movement of the shuttle vehicle first section to position said first section in relative alignment with the predetermined transverse plane of the container, second circuit means to control the lifting means to raise and lower containers from their support position on the support frame, and third circuit means to control the movement of the shuttle vehicle along the support frame from a first position to a number of second predetermined positions, thereby effecting serial lifting and conveying of the containers between the work stations and lowering the containers to rest on the support frame at the predetermined positions along the conveyance path.

13. The apparatus of claim 12, wherein the command means includes fourth circuit means for controlling the movement of the shuttle vehicle from the first position to one of the plurality of second positions as a function of the length of the container being conveyed.

14. The apparatus of claim 12, including a pair of spaced elongate rail members mounted to and supported by the support frame, the shuttle vehicle being mounted to the rails for travel therealong.

15. The apparatus of claim 14, including means for transporting the apparatus from a first location to a second location, the transporting means including a number of wheel members that support and allow movement of the support frame.

16. Apparatus of claim 2, including means responsive to the locating means for positioning the vehicle means relative to the yard end of containers being conveyed to said first work station.

* * * * *